(No Model.)  9 Sheets—Sheet 2.

T. CAHILL.
PIANOFORTE ACTION.

No. 554,109. Patented Feb. 4, 1896.

Witnesses:
M. H. Cahill.
C. W. Smith

Inventor
Thaddeus Cahill (No Model.) 9 Sheets—Sheet 3.
T. CAHILL.
PIANOFORTE ACTION.
No. 554,109. Patented Feb. 4, 1896.
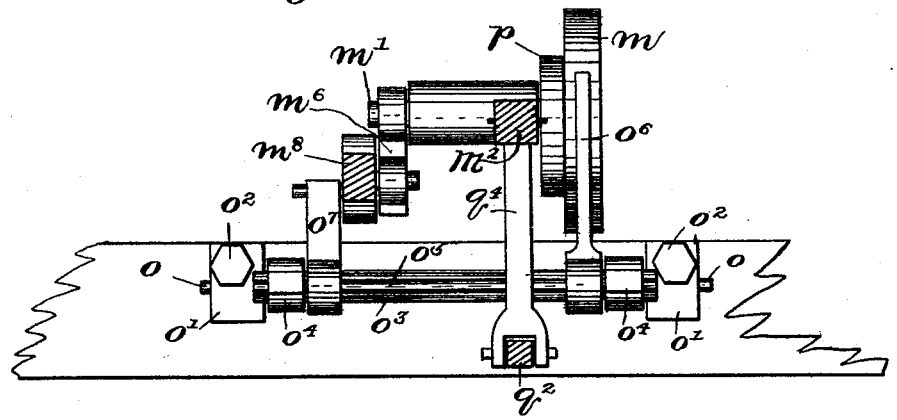
Fig. 6ᵇ
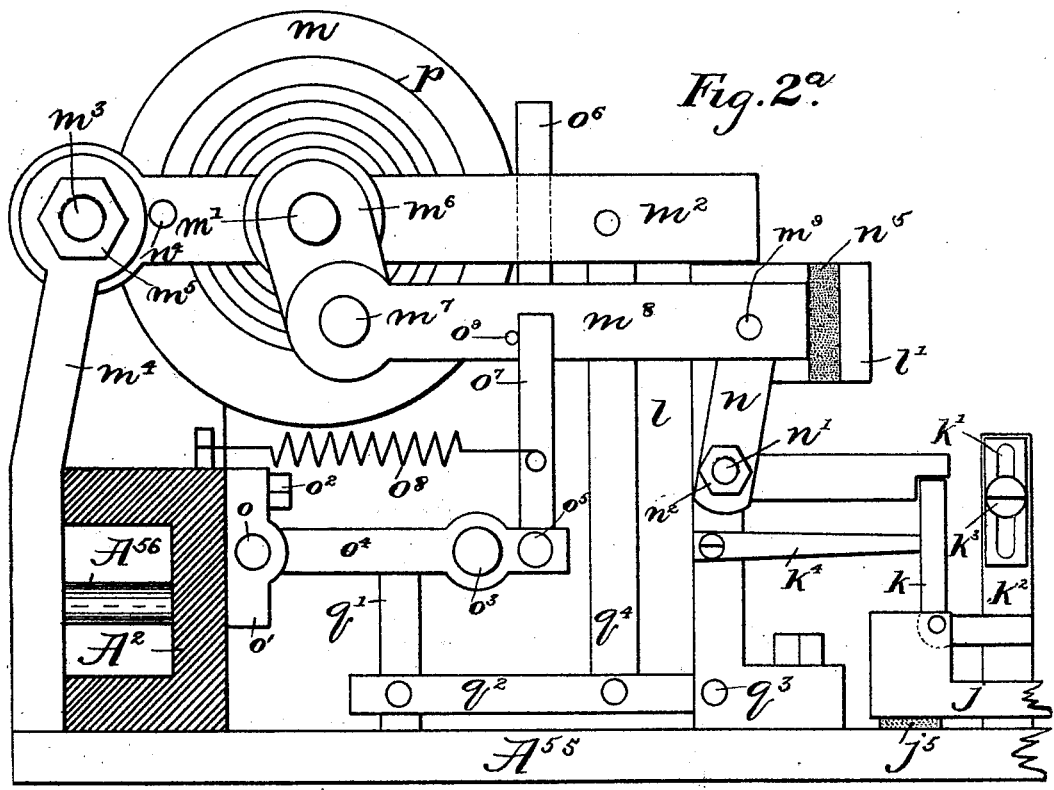
Fig. 2ᵃ
Witnesses:
M. H. Cahill
C. W. Smith
Inventor
Thaddeus Cahill.

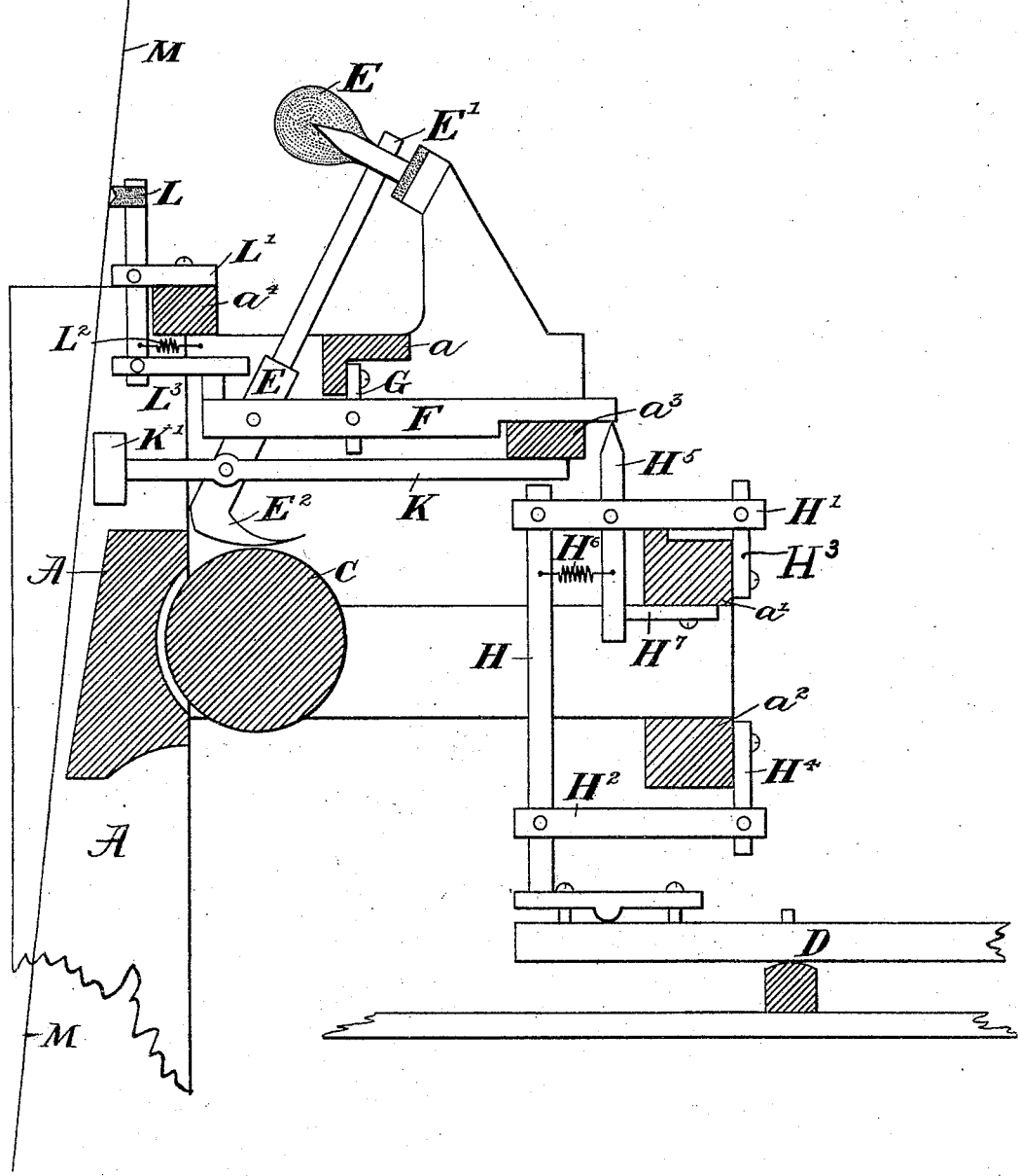

(No Model.) 9 Sheets—Sheet 5.

T. CAHILL.
PIANOFORTE ACTION.

No. 554,109. Patented Feb. 4, 1896.

Witnesses:
M. H. Cahill
C. H. Smith

Inventor
Thaddeus Cahill

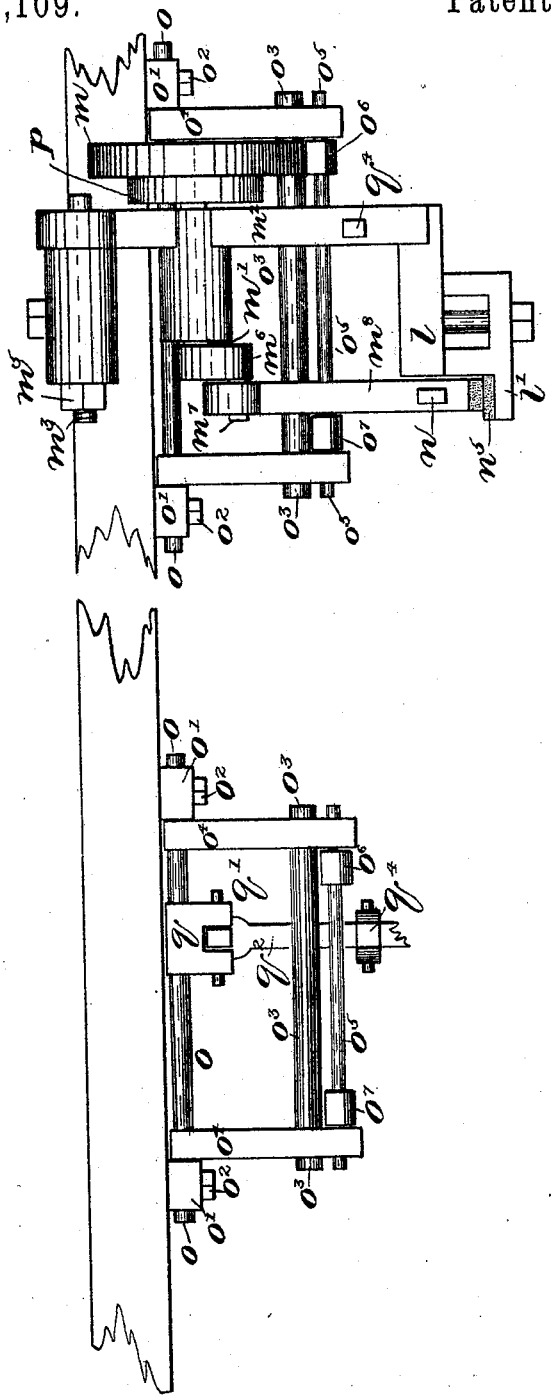

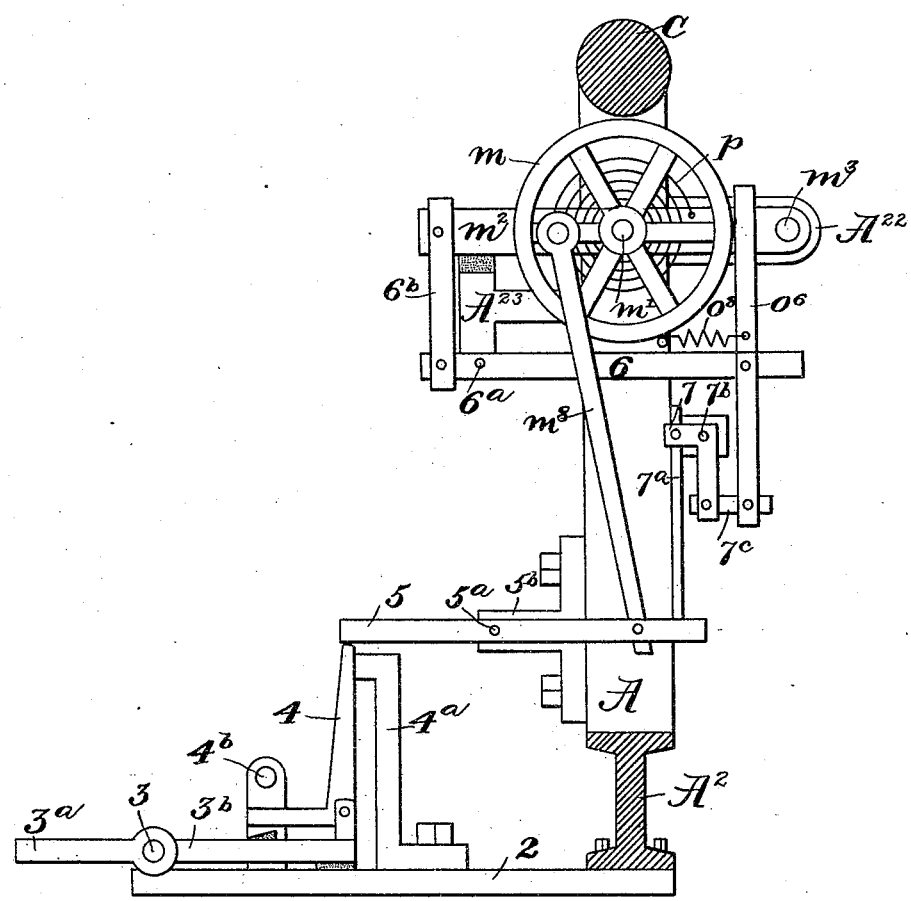

(No Model.)  T. CAHILL.  9 Sheets—Sheet 8.
PIANOFORTE ACTION.
No. 554,109.  Patented Feb. 4, 1896.
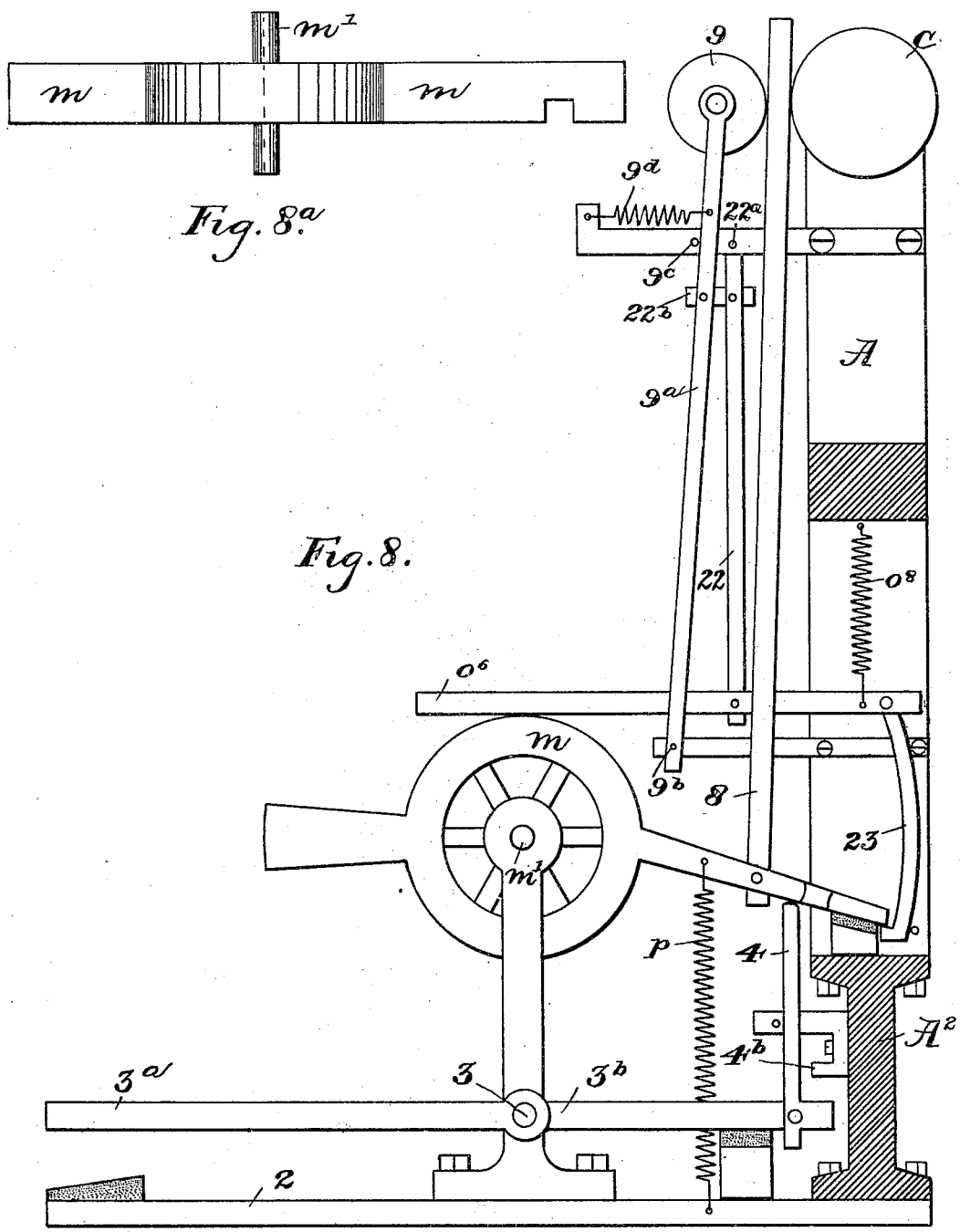

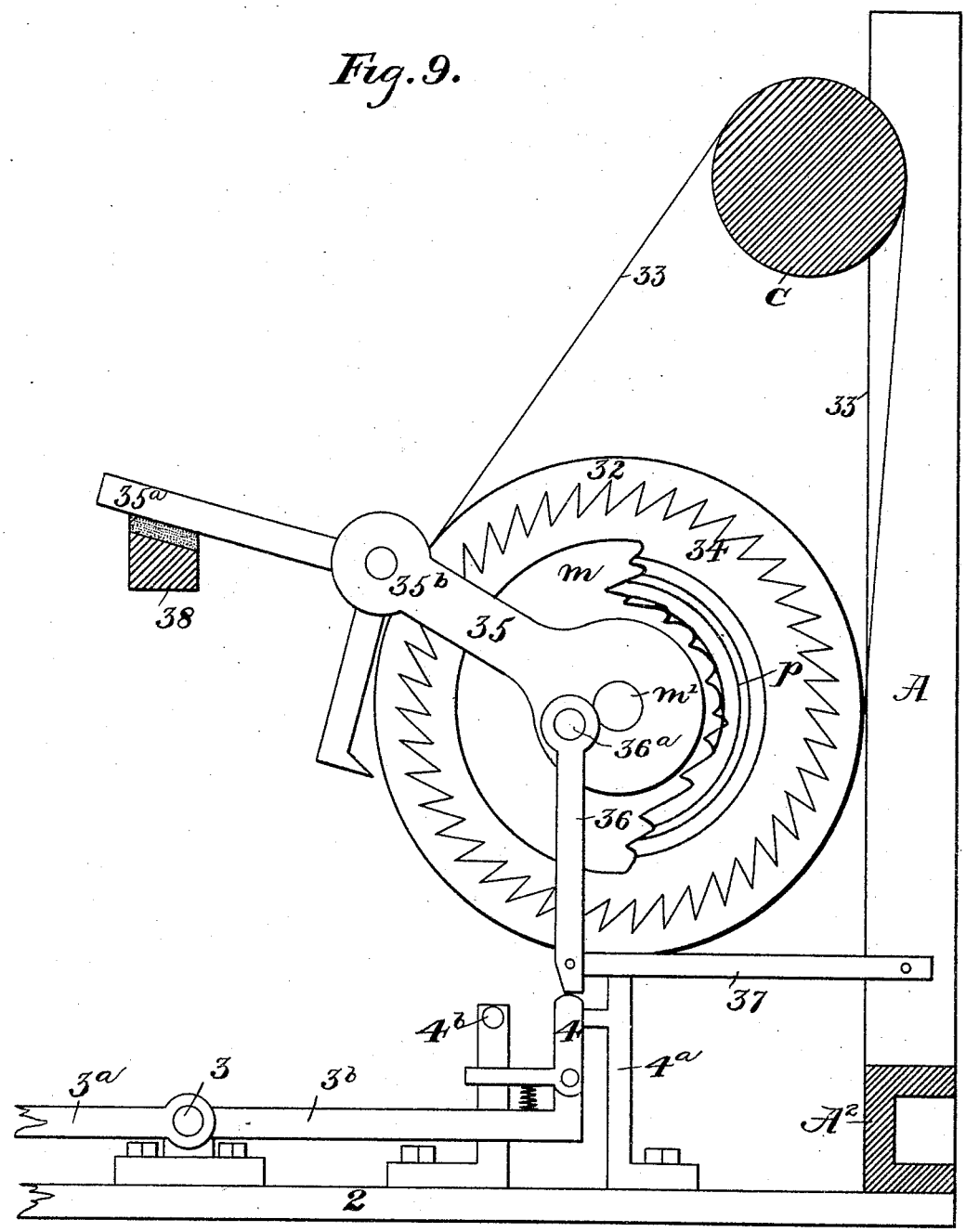

UNITED STATES PATENT OFFICE.

THADDEUS CAHILL, OF NEW YORK, N. Y.

PIANOFORTE-ACTION.

SPECIFICATION forming part of Letters Patent No. 554,109, dated February 4, 1896.

Application filed March 21, 1893. Serial No. 467,098. (No model.)

*To all whom it may concern:*

Be it known that I, THADDEUS CAHILL, a citizen of the United States, and a resident of the city, county, and State of New York, but residing temporarily at Washington, in the District of Columbia, have invented certain new and useful Improvements in Pianoforte-Actions, of which the following is a specification.

The object of my invention is to produce a sympathetic power action for the pianoforte, simple and durable in construction, requiring but little power to operate it, and so constructed that the power required by the action may be given to it by the performer without having his attention distracted from the operation of the keys; and my invention consists in the parts, improvements and combinations hereinafter described and claimed.

The essential parts of my invention are (*a*) a rotatably-mounted shaft, cylinder or drum, serving as a friction-driver, traction-shaft or tractor; (*b*) means for mounting this shaft so as to reduce to a minimum the power required to impel it; a foot-pedal arrangement for impelling the friction-driver, traction-shaft or tractor, said pedal arrangement being constructed in such a manner that it may be struck at any time by the performer, with more or less force, and the force given to it by the performer be transmitted to the friction-driver; and (*d*) means for transmitting power from the friction-driver to the hammer, controlled by the key, all of which will be more clearly explained in the following description, made with reference to the drawings, and in the statement of claim contained in the latter part of this specification.

Figure 1:
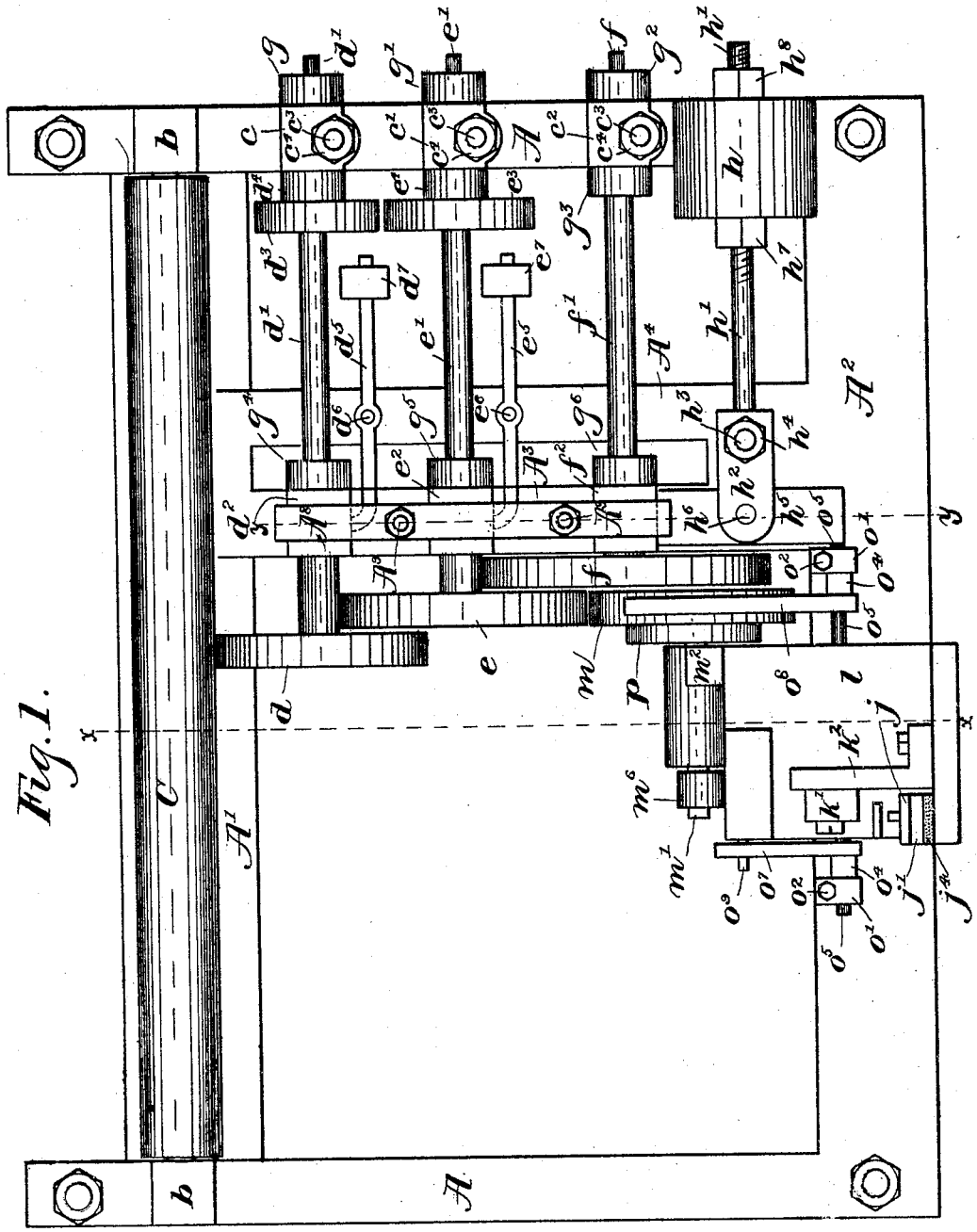
Figure 2:
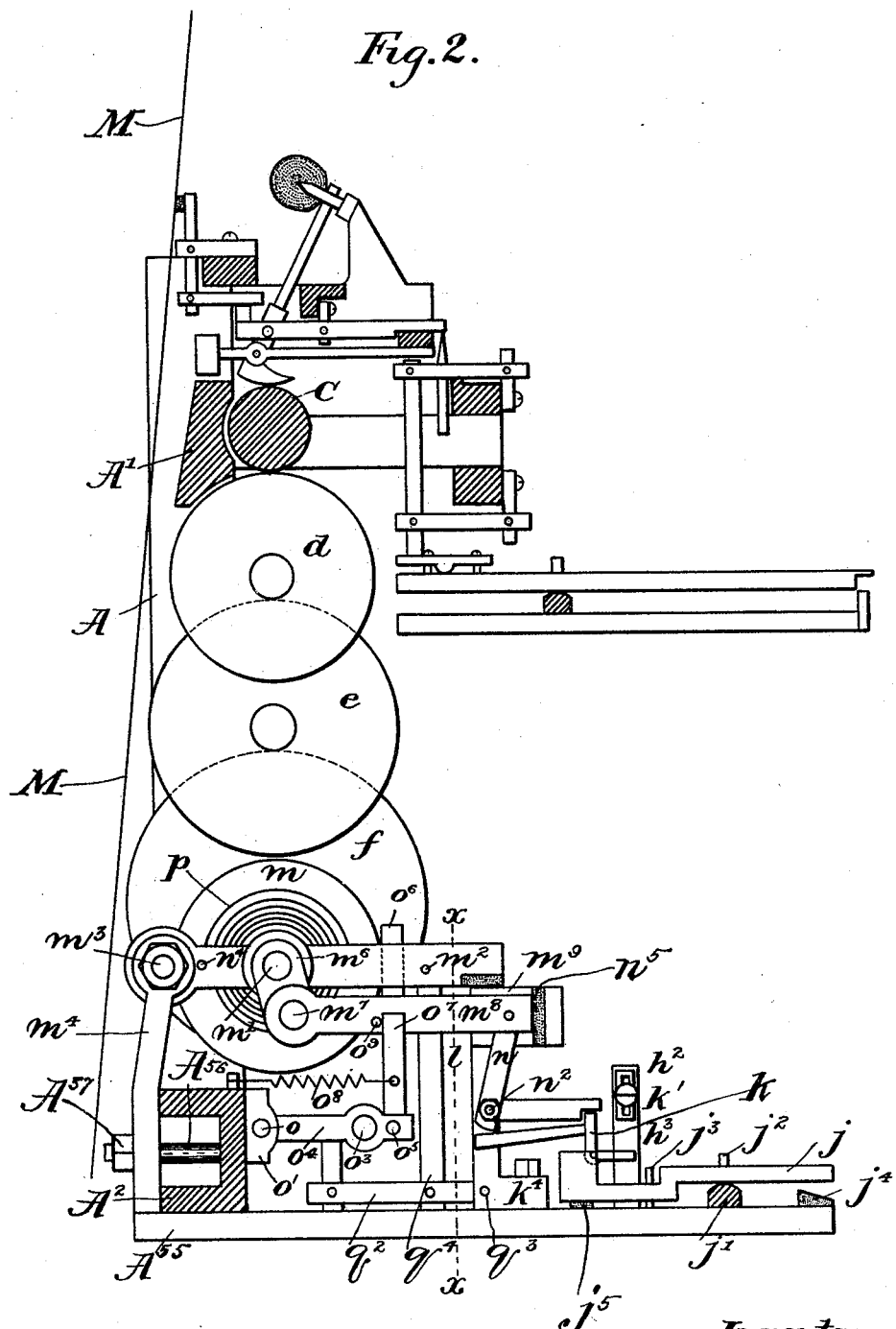
Figure 4:
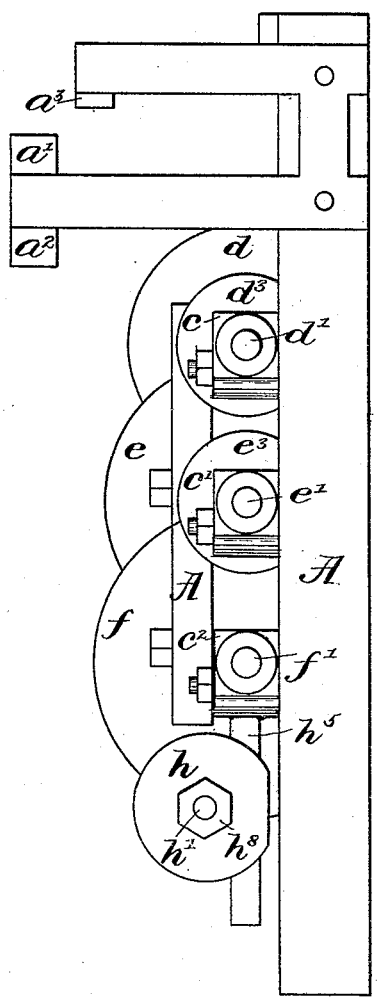
Figure 5:
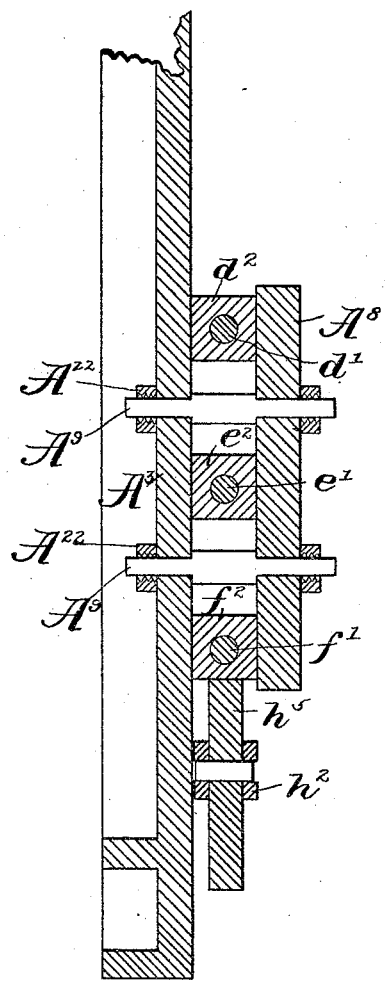

Figure 1 is a front elevation of the device, showing the friction-driver and the means of mounting it and of impelling it, the action-rails, action-brackets, hammers and connected parts not being shown. Fig. 2 is a sectional elevation of the device on the plane of the line $x\,x$ in the preceding figure. Fig. $2^a$ is an enlargement of a part of Fig. 2. Fig. 3 is a detail sectional elevation on a larger scale than Fig. 2, illustrating more clearly a portion of the mechanism shown in said Fig. 2. Fig. 4 is a side elevation. Fig. 5 is a detail sectional elevation on the line $y\,y$, Fig. 1. Fig. 6 is a detail plan view illustrating the pedal arrangement. Fig. $6^a$ is a similar view, the momentum-piece and connected parts being removed. Fig. $6^b$ is a detail front elevation, partly in section, on the line $x\,x$, Fig. 2. Figs. 7, 8 and 9 are sectional views in elevation, illustrating modified constructions. Fig. $8^a$ is a detail top view illustrating a portion of the mechanism shown in Fig. 8.

The portion of the mechanism illustrated in Fig. 3 forms the subject of another application of even date herewith, Serial No. 467,096, and the arrangement of parts for mounting the friction-driver so as to reduce its friction to a minimum forms the subject-matter of still another application of even date herewith, Serial No. 467,097.

The present application relates to the foot-pedal arrangement and its combination with other parts of the device.

The whole machine is illustrated in the drawings and referred to in the specification, because it is thought that a general knowledge of the whole is necessary to a perfect understanding of any given part.

The main frame of the action consists essentially of upright or vertical ribs A A, connected together by an upper horizontal rib, A', and a lower horizontal rib, $A^2$, said ribs A' and $A^2$ being also connected by shorter vertical ribs $A^3$ and $A^4$. Said action main frame is made of cast-iron or other suitable material and is placed in a suitable position with relation to the main frame of the piano, which latter, as it forms no part of my invention, and differs greatly in different instruments, is not shown in the drawings.

Retaining-boxes $b\,b$, in line with each other, are attached to the main frame by studs and bolts. (Not seen.) In these boxes the traction-shaft or friction-driver C is set. When the mechanism is adjusted as it should be no part of the weight of the friction-driver C falls on the boxes $b\,b$. They serve only to retain it in its proper position to prevent the displacement of it. Hence I call them "retaining-boxes." There is nothing peculiar in the construction of these retaining-boxes. Any suitable form of box or journal may be used. Three boxes $c\,c'\,c^2$, exactly similar to each other, are mounted upon stud-posts $c^3\,c^3\,c^3$, so as to be capable of swiveling thereon. The stud-posts $c^3\,c^3\,c^3$ are attached to the main frame A by nuts $c^4 c^4 c^4$, (not seen in the main view,) while similar nuts $c^4 c^4 c^4$ serve to retain the boxes $c$ $c'$ $c^2$, respectively, on their stud-posts. A supporting-wheel $d$ lies normally under the center of gravity of the friction-driver $c$. A shaft $d'$ is attached fast to the wheel $d$. Said shaft $d'$ passes through a vertically-movable retaining-box $d^2$ and through the swiveling box $c$. It rests upon the supporting-wheel $e$. A shaft $e'$ is attached fast to the wheel $e$. Said shaft $e'$ passes through a vertically-movable retaining-box $e^2$ and through the swiveling box $c'$. It rests upon a supporting-wheel $f$. A shaft $f'$ is attached fast to the wheel $f$. Said shaft $f'$ passes through a vertically-movable retaining-box $f^2$ and through the swiveling box $c^2$. A weight-wheel $d^3$, having a hub $d^4$, is attached to the shaft $d'$, and a similar but heavier weight-wheel $e^3$, having a hub $e^4$, is attached to the shaft $e'$.

$g$, $g'$, $g^2$, $g^3$, $g^4$, $g^5$ and $g^6$ are collars attached to the shafts $d'$, $e'$, and $f'$ by set-screws. (Not shown in the drawings.) Displacement of the shaft $d'$ in the line of its axis is prevented by the hub $d^4$ and the collar $g$, which lie on opposite sides of the box $c$ and in close proximity to it.

Displacement of the shaft $e'$ in the line of its axis is prevented by the hub $e^4$ and the collar $g'$, which lie on opposite sides of the box $c'$ and in close proximity to it. Displacement of the shaft $f'$ in the line of its axis is prevented by the collars $g^2$ and $g^3$, which lie on opposite sides of the box $c^2$ and in close proximity to it. The retaining-boxes $d^2$ $e^2$ $f^2$, respectively, are prevented from displacement in the line of the axes of their respective shafts $d'$, $e'$, and $f'$ by the collars $g^4$, $g^5$, and $g^6$, respectively, and by the greater diameter of their respective shafts $d'$, $e'$, and $f'$ between said boxes $d^2$, $e^2$, and $f^2$, respectively, and the wheels $d$, $e$, and $f$, respectively, the diameters of the shafts $d'$, $e'$, and $f'$ within their respective vertically-movable retaining-boxes being the same as their diameter to the right of said boxes, while their diameter to the left of said boxes is greater. The boxes $d^2$, $e^2$, and $f^2$ are exactly similar to each other and are held in place by the main-frame rib $A^3$ and the plate $A^8$. The latter is held in place by studs $A^9$ $A^9$ and retaining-nuts. These studs consist of a central portion of larger diameter and end portions of smaller diameter, threaded at the extremities. They are secured to the main-frame rib $A^3$ by nuts $A^{22}$ $A^{22}$, and the distance between the rib $A^3$ and the plate $A^8$ is slightly greater than the thickness of the boxes $d^2$, $e^2$, and $f^2$, so that said boxes are free to move vertically, but are kept from horizontal displacement. A lever $d^5$, swivelingly mounted on a stud-post $d^6$ and carrying a weight $d^7$, exerts a pressure upward on the box $d^2$ exactly equal to the weight of said box. A similar lever, $e^5$, swivelingly mounted on a stud-post $e^6$ and carrying a similar weight, $e^7$, in like manner exerts a pressure upward on the box $e^2$ exactly equal to the weight of said box. The wheel $d^3$ is made of such a weight that the shaft $d'$ balances on the supporting-wheel $e$ when the weight of the friction-driver $C$ is resting upon the wheel $d$. In like manner the wheel $e^3$ is made of such a weight that the shaft $e'$ balances upon the supporting-wheel $f$ when the weight of the friction-driver $C$ and the weight of the shaft $d'$, and the parts attached to it rest upon the wheel $e$. A weight $h$ is set upon a rod $h'$, which is attached to a casting $h^2$, which is swivelingly mounted on a stud-post $h^3$ and held in place thereon by a nut $h^4$. A push-bar $h^5$ is attached by the center-pin $h^6$ to the casting $h^2$. The rod $h'$ is threaded and the weight $h$ is adjusted thereon by nuts $h^7$ and $h^8$. The weight $h$ is made of such a mass and is so adjusted on the rod $h'$ that it exerts an upward pressure on the box $f^2$, through the push-bar $h^5$, exactly equal to the downward pressure on said box of the shaft $f'$ and the parts whose weight it bears. Thus the weight of the friction-driver is borne in the first place by the supporting-wheel $d$, which transmits it, by the shaft $d'$, to the wheel $e$, which in turn transmits it by the shaft $e'$ to the wheel $f$. It will be seen also that as the parts are proportioned in the drawings the angular velocity of the wheel $d$ is much less than that of the friction-driver $C$, and the angular velocity of the wheel $e$ is much less than that of the wheel $d$, and the angular velocity of the wheel $f$ is much less than that of the wheel $e$. In this manner the friction is very greatly reduced.

$j$ is a foot-pedal projecting out in front of the instrument beneath the keys and in convenient reach of the performer. It is fulcrumed upon a bar $j'$ and held in place by the pins $j^2$ and $j^3$. The bar $j'$ is attached to the support $A^5$, which projects forward from the main frame $A$ and is attached to said main frame by a stud $A^{56}$ and nut $A^{57}$. The pin $j^2$ is driven into the bar $j'$ and the pin $j^3$ into the support $A^{55}$. Wads of felt $j^4$ and $j^5$ serve to limit the motion of the foot-pedal. An escapement-lever $k$ is pin-jointed to the pedal $j$.

$k'$ is an adjustable jack-stop, which is attached to the standard $k^2$ by screws $k^3$ $k^3$.

$k^4$ is a stop against which the lever $k$ is normally pressed by a concealed spring.

A momentum-piece or momentum-wheel $m$ is attached fast to the shaft $m'$, which is mounted in a lever $m^2$, said lever having an extension of circular cross-section at right angles to itself, which extension forms a box or bearing for the shaft $m'$. The lever $m^2$ has a shaft $m^3$ attached to it, which shaft is swivelingly mounted in a standard $m^4$, which is bolted to the main frame $A$. A retaining-nut $m^5$ prevents displacement of the shaft $m^3$ in the line of its axis. The lever $m^2$ normally rests upon the top of the standard $l$, and when said lever is in its normal position the momentum-wheel $m$ lies in close proximity to the wheel $e$, but not in contact therewith. A crank $m^6$ is attached to the shaft $m'$. Said crank is connected by a center-pin $m^7$ with a pitman $m^8$, which is connected by a center-pin $m^9$ with a bell-crank lever $n$, which is supported by a stud $n'$ fixed in the standard $l$. Displacement of the lever $n$ in the line of its axis is prevented by a retaining-nut $n^2$. A coiled spring $p$, one of whose ends is attached to the shaft $m'$ and the other to a pin $n^4$, set in the lever $m^2$, holds the pitman $m^8$ normally in contact with the felt wad $n^5$, attached to an arm or projection $l'$ of the standard $l$. A rod $o$ is supported by flanges $o'$ $o'$, which are attached to the main frame A by bolts $o^2$ $o^2$. The rod $o$ forms part of the frame, the other parts of which are a front rod, $o^3$, and two side bars, $o^4$ $o^4$. These parts $o$, $o^3$, $o^4$ and $o^4$ are rigidly attached to each other so as to form a stiff frame. A rod $o^5$ is swivelingly mounted on the side bars, $o^4$ $o^4$. To this rod $o^5$ are rigidly attached an upright traction-piece $o^6$ and a shorter upright piece $o^7$. The traction-piece $o^6$ lies in front of the momentum-wheel $m$. A contractile spring $o^8$, one of whose ends is attached to the main-frame rib $A^2$ and the other to the piece $o^7$, which is connected with the traction-piece $o^6$, tends to press said piece $o^6$ against the momentum-wheel $m$; but a pin $o^9$, set fast in the pitman $m^8$, presses the upright piece $o^7$ and so holds the traction-piece $o^6$ away from the momentum-wheel $m$ whenever said pitman is in its normal position of contact with the felt wad $n^5$. An arm $q$, rigidly attached to the rod $o$, is connected by a link or pull-piece $q'$ with a lever $q^2$, which is supported by a pin $q^3$, set in the standard $l$. Said lever $q^2$ is connected by a push-bar $q^4$ with the lever $m^2$.

When the pedal $j$ is pressed down by the performer, the escapement-lever or jack $k$ rises and throws up the horizontal arm of the bell-crank lever $n$ and forces in the vertical arm of said lever, which, through the center-pin $m^9$, pitman $m^8$, crank-pin $m^7$, and crank $m^6$, gives to the shaft $m'$ and momentum-wheel $m$ an angular motion in the direction of the normal movement of watch-hands. When the horizontal arm of the escapement-lever $k$ strikes the jack-stop $k'$ the vertical arm is withdrawn from contact with the horizontal arm of the bell-crank lever $n$, and the pedal ceases to impel said lever $n$ and the parts connected therewith and is arrested by the felt wad $j^4$; and so long as the pedal is held down by the performer the vertical arm of the lever $k$ is held clear of and away from the horizontal arm of the bell-crank $n$. The momentum of the momentum-wheel $m$ carries it on, after the pedal ceases to impel it, until the resistance of the opposing spring $p$ overcomes its *vis viva* and begins to turn it in a direction contrary to its former motion and to return the parts to their normal positions. So soon as the momentum-wheel $m$ begins thus to move in a direction contrary to watch-hands, under the influence of the spring $p$, the traction-piece $o^6$, which is pressed against the wheel $m$ by the contractile spring $o^8$ pulling on the piece $o^7$, rises under the influence of the traction of the wheel $m$, and in rising draws up the frame composed of the side bars, $o^4$ $o^4$, front rod, $o^3$, and back rod, $o$, and so draws up the arm $q$, attached to said rod $o$, which draws up the link $q'$, and the lever $q^2$, which, through the push-up $q^4$, raises the lever $m^2$ and presses the wheel $m$ against the wheel $e$. The momentum-wheel $m$ now rolls in contact with the friction-driver $e$ under a considerable pressure, and gives out the power stored in the spring $p$ to the friction-driver $c$, and so returns to its normal position. Just before it reaches this position—just before the pitman $m^8$ strikes the felt wad $n^5$—the pin $o^9$, fixed in the pitman $m^8$, strikes the upright piece $o^7$ and moves it and the traction-piece $o^6$, connected with it, in opposition to the contractile spring $o^8$, thus forcing the traction-piece $o^6$ away from contact with the wheel $m$, and holding it away from said wheel, which, under the influence of gravity, immediately falls away from its position of contact with the wheel $e$, the lever $m^2$, to which the wheel $m$ is connected, coming to rest in its normal position of contact with the top of the standard $l$.

D is the key; E, the hammer; E', the hammer-shank; $E^2$, the hammer-butt, which is pin-jointed to the pressure-lever F, which last is attached by the flange G to the action-rail $a'$. The hammer-butt serves as a contact-piece to take power from the friction-driver C. The lower surface of said hammer-butt $E^2$ is curved, the center from which the curve is described being the center of the pin by which the hammer-butt $E^2$ is connected with the pressure-lever F.

H is the reach-up, which is pin-jointed to the bridle-levers H' and $H^2$, which are attached by flanges $H^3$ and $H^4$, respectively, to the action-rails $a'$ and $a^2$, respectively. A jack or fly-lever $H^5$ is also pin-jointed to the lever H'. An expansive spring $H^6$ holds the jack $H^5$ normally in contact with the adjustable stop $H^7$, which is attached to the rail $a'$ by a screw passing through an elliptical slot in said stop $H^7$, whereby adjustment of said stop is made. In its normal position the jack $H^5$ lies under the end of the pressure-lever F and in close proximity thereto. A push-bar $k$ is pin-jointed to the hammer-butt $E^2$ below the center of attachment of said hammer-butt with the pressure-lever. A weight K' serves to balance the push-bar on the pin by which it is connected with the hammer-butt $E^2$. The pressure-lever F rests normally in contact with the action-rail $a^3$ and holds the curved hammer-butt $E^2$ in close proximity to, but free from contact with, the friction-driver C. The front part of the push-bar K lies between the lower surface of the action-rail $a^3$ and the upper surface of the reach-up H. The damper-lever L is attached by a flange L' to the rail $a^4$. A spring holds the damper normally in contact with the string M, to which it corresponds. A push-bar $L^3$ is connected with the damper-lever and arranged in the path of motion of the hammer-butt, so that the hammer's movement toward the string withdraws the damper from contact with the string. The shaft C is rotated in the manner already described.

When the key D is depressed by the performer it raises the reach-up H, which through the intervention of the bridle-lever H' and jack or fly-lever H⁵ moves the pressure-lever F from its normal position and presses the curved surface of the hammer-butt E² against the moving friction-driver C, which at once exerts a traction on said hammer-butt approximately proportional to the pressure on the key and throws the hammer toward the string M. As the hammer E moves toward the string, the push-bar K moves toward the jack H⁵, and at or about the instant the hammer strikes the string the push-bar K forces the lever H⁵ out from under the pressure-lever F, which immediately returns to its normal position, raising the hammer-butt E² from contact with the friction-driver C and so releasing said hammer-butt from the traction of said friction-driver. At the same time the reach-up H, under the influence of the pressure on the key, rises a little and pushes and presses the push-bar K against the action-rail $a^3$, by which it is arrested. The hammer now rebounds and retreats from the string a certain distance, the force of the rebound being broken by the friction of the push-bar K against the top of the reach-up H and the bottom of the rail $a^3$, against which it is pressed by said reach-up. In this position the hammer is held until the key is released, when the parts return to their normal positions.

A modified construction in which the momentum-piece acts directly upon the friction-driver is illustrated in Fig. 7. 2 is a stiff bar, rib or rail, firmly bolted to the rib A², about the center of the instrument and projecting forward from said rib. 3 is a rock-shaft lying parallel with the rib A² and extending from near the center of the instrument down to the base side or end of it. Said rock-shaft is suitably supported by the bar 2 at one end, and at the other end by a similar bar, (not seen in the drawings,) and is provided with a forward-extending arm $3^a$ and a rearward-extending arm $3^b$. The arm $3^a$ lies near the center of the instrument in a position where it may be conveniently acted upon by the foot of the performer. The arm $3^b$ lies to the left of the arm $3^a$ and carries a jack 4, which is spring-pressed against and lies normally in contact with the upright piece $4^a$. The jack 4 lies normally with its top immediately under the front end of a lever 5, which is fulcrumed upon a center $5^a$ attached to a bracket $5^b$, which latter is firmly bolted to one of the upright ribs A of the action main frame. The jack-stop is marked $4^b$. The momentum-wheel $m$ is revolubly attached to the shaft $m'$, which is mounted on the lever $m^2$. Said lever $m^2$ has a shaft $m^3$ attached to it, which is journaled in the arm $A^{22}$ extending back from the upright A. A coiled spring $p$ tends to urge the momentum-wheel $m$ in the direction in which watch-hands normally move. A pitman $m^8$ connects the lever 5 with momentum-wheel $m$. A lever $o^6$, serving as a traction-piece, lies in a position of close proximity to the momentum-wheel $m$, and is normally drawn toward said momentum-wheel by the action of the contractile spring $o^8$. Said lever $o^6$ is fulcrumed upon the lever 6. Said lever 6 is centered on a pin $6^a$ set fast in the projection $A^{23}$ extending forward from the upright A, and is connected by a link $6^b$ with the lever $m^2$. A bell-crank lever 7, carrying a push-up $7^a$, and fulcrumed at the point $7^b$, is connected by a link $7^c$ with the traction-lever $o^6$. The push-up $7^a$ serves when the lever 5 is in its normal position to hold the traction-piece $o^6$ away from contact with the momentum-wheel $m$; but so soon as the lever 5 is moved from its normal position by the action of the parts $3^a$, 3, $3^b$ and 4, in the manner hereinafter described, the spring $o^8$ presses the traction-piece $o^6$ against the momentum-wheel $m$.

The operation of the device is as follows: When the rock-shaft arm $3^a$, which serves as a pedal, is depressed by the performer, the arm $3^b$ rises, and through the jack 4, lever 5 and pitman $m^8$ moves the momentum-wheel (in opposition to the spring $p$) in the contrary direction to that in which watch-hands move. When the longitudinal arm of the jack 4 strikes the jack-stop $4^b$, the jack is withdrawn from under the end of the lever 5, so that it no longer serves either to move said lever and the momentum-piece, or to block their movement; and in this position the jack remains so long as the arm $3^a$ is held down. Meantime the momentum-wheel continues its motion under the influence of its acquired momentum, until its *vis viva* is spent upon the spring $p$, and it comes to rest. The spring $p$ now returns the momentum-piece to its normal position. The momentum-wheel, in thus returning to its normal position, shoves down the traction-piece $o^6$, which through the lever 6, link $6^b$ and lever $m^2$ presses the momentum-wheel $m$ firmly against the friction-driver C. The momentum-wheel thus returns to its normal position, rolling in contact with the friction-driver, and giving out to the friction-driver the power stored in the spring $p$ by the preceding movement of the momentum-piece. At or about the instant the momentum-piece reaches its normal position the lever 5 bears up upon the push-up $7^a$ and through the bell-crank lever 7 and link $7^c$ forces the traction-piece $o^6$ away from contact with the momentum-wheel $m$, whereupon said wheel falls away from contact with the friction-driver C, leaving said part free to move on unimpeded.

Fig. 8 (which is drawn to a larger scale than the preceding drawings) illustrates still another modification, in which the momentum-wheel has no motion save its rotary motion, but acts on the friction-driver through a bar or equivalent connected with the momentum-piece so as to be moved thereby and arranged to be pressed against the friction-driver when the momentum-piece is returning to its normal position, so that it conveys power from the momentum-piece to the friction-driver. The rock-shaft 3, with its arms $3^a$ and $3^b$, the jack 4 and jack-stop $4^b$, the momentum-piece $m$, with its axle $m'$, contractile spring $p$, traction-piece $o^6$, and spring $o^8$ will be understood from the description already given. 8 is the bar before-mentioned attached at one end to the momentum-piece, so that it is moved thereby. Said bar 8 lies between the friction-driver C and a small light wheel 9. Said wheel 9 is carried by the lever $9^a$, which is fulcrumed at $9^b$. Said lever $9^a$ is held normally in contact with the stop $9^c$ by the contractile spring $9^d$. The traction-piece $o^6$ is pin-jointed to a lever 22, which is fulcrumed at $22^a$ and connected by a link $22^b$ with the lever $9^a$. When the momentum-piece occupies its normal position, the arm to which bar 8 is attached acts upon the pull-down 23 to hold the traction-piece away from contact with the momentum-piece $m$. When the performer acts upon the arm $3^a$ and the jack 4 moves the momentum-wheel in the opposite direction to that in which watch-hands move, the lever $9^a$ is held against the stop $9^c$, the wheel 9 stands away from the friction-driver C, and the bar 8 moves up loosely and freely between said wheel and the friction-driver; but the instant the momentum-piece begins to return to its normal position, the traction-piece $o^6$, acting through the lever 22, link $22^b$, lever $9^a$ and wheel 9, presses the bar 8 firmly against the momentum-piece, so that it rolls in contact therewith and conveys power thereto while the momentum-piece is returning to its normal position. Just before the momentum-piece $m$ reaches this position its inwardly-extending arm strikes the pull-down 23, thus withdrawing the traction-piece $o^6$ from contact with the momentum-piece, and leaving the wheel 9 free to start retreat from the friction-driver C, and freeing the bar 8 from contact therewith.

Fig. 9, which is a sectional elevation similar to Figs. 7 and 8, illustrates my invention with the momentum-piece connected with the friction-driver by a pawl and ratchet-wheel, instead of the traction arrangement before described. 3 is the rock-shaft; $3^a$ and $3^b$, the rock-shaft arms; 4, the jack, and $4^b$ the jack-stop, all as before described. 32 is a belt-pulley connected by a belt 33 with the friction-driver C. 34 is a ratchet-wheel attached fast to the belt-pulley 32. $m$ is the momentum-piece and $m'$ is an axle upon which the belt-pulley and attached ratchet 34 and the momentum-piece $m$ are loosely mounted. 35 is a casting attached fast to the momentum-piece $m$, and $35^a$ is a pawl or dog hung on a pin $35^b$ carried by the part 35. 36 is a push-up or pitman whose upper end is connected with the casting 35 and momentum-piece $m$ by a pin $36^a$ and whose lower end lies immediately over the jack. 37 is a guide-lever connected with the lower end of the push-up 36. 38 is a stop for the dog or pawl $35^a$. $p$ is a strong coiled spring lying around the fixed axle $m'$, between the momentum-piece $m$ and the ratchet 34, one end of said spring being attached to the momentum-piece $m$ and the other to the shaft $m'$.

The operation is as follows: When the rock-shaft arm $3^a$ is pressed down by the foot of the performer, the arm $3^b$ rises and through the jack 4 and pitman 36 throws the momentum-piece $m$ around in the direction in which watch-hands move. When the momentum-piece $m$ returns to its normal position under the influence of the returning-spring $p$, the pawl $35^a$ engages with the teeth of the wheel 34 and gives out to said wheel 34 the power communicated to the momentum-piece by the preceding depression of the arm or pedal $3^a$. The belt 33 conveys the power from the ratchet 34 and pulley 32 to the friction-driver C. A little before the momentum-piece reaches its normal position, the horizontal arm of the pawl $35^a$ comes in contact with the stop 38, whereby the vertical arm of said pawl is retracted from the ratchet 34.

The momentum-piece may be made of any suitable form. That described I consider as useful and convenient as any. The tractional arrangement by which a frictional connection is established between the momentum-piece and the friction-driver may be made in a great many different ways; and the traction-piece might be pressed as well against a part moved by or with the momentum-piece as against the momentum-piece itself.

The arrangement of jack or escapement may of course be varied in a great many different ways.

I do not claim herein the arrangement of hammer, contact-piece, contact-piece carrier, escapement and check illustrated in Figs. 2 and 3. The same forms the subject-matter of another application of even date herewith, Serial No. 467,096. Nor do I claim herein the arrangement of parts for mounting the friction-driver so as to reduce the friction thereof. The same forms the subject-matter of another application of even date herewith, Serial No. 467,097; but What I do claim herein, and desire to secure by Letters Patent, is—

1. In a pianoforte, and in combination, a rotatively-mounted friction-driver and means for impelling the same, including a pedal, an escapement and a part operated by said pedal through the intervention of said escapement.

2. In a pianoforte and in combination, a rotatively-mounted friction-driver and means for impelling the same including a pedal, an escapement, and a momentum-piece, the momentum-piece being set in motion by the pedal through the intervention of the escapement, and arranged in such a manner that it is free to move on after the pedal ceases to impel it.

3. In a pianoforte and in combination, a rotatively-mounted friction-driver and means for impelling the same including a pedal; an escapement; a momentum-piece, set in motion by the pedal through the intervention of the escapement and arranged in such a manner that it is free to move on after the pedal ceases to impel it; and an opposing spring, or equivalent, serving to resist the movement of the momentum-piece in the direction in which it is impelled by the pedal and to return said momentum-piece to its normal position.

4. In a pianoforte and in combination, a rotatively-mounted friction-driver and means for impelling the same including a pedal; an escapement; a momentum-piece, said momentum-piece being set in motion by the pedal through the intervention of the escapement, and arranged in such a manner that it is free to move on after the pedal ceases to impel it; an opposing spring, or equivalent, serving to oppose the movement of the momentum-piece in the direction in which it is impelled by the pedal and to return said momentum-piece to its normal position; and an arrangement serving to connect the momentum-piece with the friction-driver during the return movement of the momentum-piece, so that the momentum-piece, during its return movement, communicates to the friction-driver, in great part, the power which it received from the pedal.

5. In a pianoforte and in combination, a rotatively-mounted friction-driver and means for impelling the same including a pedal and momentum-piece, set in motion by the pedal, and arranged in such a manner that it is free to move on after the pedal ceases to impel it.

6. In a pianoforte and in combination, a rotatively-mounted friction-driver and means for impelling the same including a pedal; a momentum-piece set in motion by said pedal, and arranged in such a manner that it is free to move on after the pedal ceases to impel it; and an opposing spring, or equivalent, serving to resist the movement of the momentum-piece in the direction in which it is impelled by the pedal, and to return said momentum-piece to its normal position.

7. In a pianoforte and in combination, a rotatively-mounted friction-driver and means for impelling the same including a pedal; a momentum-piece, set in motion by the pedal and arranged in such a manner that it is free to move on after the pedal ceases to impel it; an opposing spring serving to resist the movement of the momentum-piece in the direction in which it is impelled by the pedal, and to return said momentum-piece to its normal position; and an arrangement serving to connect the momentum-piece with the friction-driver during the return movement of the momentum-piece, so that said momentum-piece, during its return movement, communicates to the friction-driver, in great part, the power which it received from the pedal.

8. In a pianoforte and in combination, a rotatively-mounted friction-driver and an intermittingly-acting pedal for impelling said friction-driver, said pedal being arranged to move independently of the friction-driver.

9. In a pianoforte and in combination, a rotatively-mounted friction-driver, a pedal; a part impelled thereby; and an intermittingly-acting frictional connection serving to transmit power from said pedal to said friction-driver.

10. In a pianoforte and in combination, a rotatively-mounted friction-driver; a pedal; an escapement; a part impelled by the pedal through the intervention of the escapement; and an intermittingly-acting frictional connection serving to transmit power to the friction-driver from the before-mentioned part impelled by the pedal.

11. In a pianoforte and in combination, a rotatively-mounted friction-driver; a pedal; a momentum-piece set in motion by said pedal and arranged in such a manner that it is free to move on after said pedal ceases to impel it; an opposing spring, or equivalent, serving to resist the movement of the momentum-piece in the direction in which it is impelled by the pedal, and to return said momentum-piece to its normal position; and a traction arrangement controlled by said momentum-piece, and serving to establish a frictional connection between said momentum-piece and the friction-driver, during the return movement of the momentum-piece.

12. In a pianoforte and in combination, a rotatively-mounted friction-driver; a pedal; an escapement; a momentum-piece, set in motion by the pedal, through the intervention of the escapement, and arranged in such a manner that it is free to move on after the pedal ceases to impel it; an opposing spring, or equivalent, serving to resist the movement of said momentum-piece in the direction in which it is impelled by the pedal, and to return said momentum-piece to its normal position, and a traction arrangement controlled by said momentum-piece, and serving to establish a frictional connection between said momentum-piece and the friction-driver, during the return movement of the momentum-piece.

In testimony whereof I have hereunto set my hand, at Washington, in the District of Columbia, this 17th day of March, A. D. 1893.

THADDEUS CAHILL.

Witnesses:
MARGARET CAHILL,
C. S. DRURY.